US010948058B2

(12) United States Patent
Han (10) Patent No.: US 10,948,058 B2
(45) Date of Patent: Mar. 16, 2021

(54) ELECTRO-MAGNETIC RATCHET CONTROL APPARATUS AND METHOD

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 16/267,667

(22) Filed: Feb. 5, 2019

(65) Prior Publication Data

US 2019/0242467 A1 Aug. 8, 2019

Related U.S. Application Data

(60) Provisional application No. 62/626,888, filed on Feb. 6, 2018.

(51) Int. Cl.
*F16H 29/04* (2006.01)
*F16D 27/01* (2006.01)
*F16H 3/52* (2006.01)

(52) U.S. Cl.
CPC ............. *F16H 29/04* (2013.01); *F16D 27/01* (2013.01); *F16H 3/52* (2013.01)

(58) Field of Classification Search
CPC . F16H 29/04; F16H 3/52; F16D 27/01; F16D 27/004; F16D 41/066; F03D 13/264; F03D 15/00; F03D 15/10; F03D 15/12
USPC ................ 475/169; 290/42, 43, 53
See application file for complete search history.

(56) References Cited

U.S. PATENT DOCUMENTS

| 8,338,481 | B2 | 12/2012 | Kloog et al. | |
|---|---|---|---|---|
| 8,485,933 | B2 | 7/2013 | Han | |
| 8,702,552 | B2 | 4/2014 | Han | |
| 8,986,149 | B2 | 3/2015 | Han | |
| 8,992,370 | B2 | 3/2015 | Han | |
| 9,151,269 | B2 | 10/2015 | Han | |
| 9,169,772 | B2 | 10/2015 | Han | |
| 2012/0115662 | A1* | 5/2012 | Han | F03D 15/10 475/31 |
| 2012/0243991 | A1* | 9/2012 | Han | F03D 15/00 416/9 |

(Continued)

*Primary Examiner* — Victor L MacArthur
(74) *Attorney, Agent, or Firm* — Cameron LLP (57) ABSTRACT

A speed converter converting infinitely variable reciprocating input to uni-directional output, for example, comprising a driver, the driver comprising a variable pitch cam and a rack gear and one-way clutch bearings or Sprags and output shaft, the driver having an oblong shape may be converted to provide direction control in either of two directions and free-wheeling. The one-way clutch bearings or Sprags of a first Goldfinch speed converter are modified to comprise, concentric with the output shaft, a permanent magnet imbedded in a driven gear and direction controlling stator coils. A plurality of four (or more) electrical pulses (sine curves) may be applied to the stator coils to provide three possible outputs of desired speed: a forward output direction, a neutral or free-wheeling output and a reverse output direction. In this manner, an electro-magnetic ratchet control system may modify the speed converter to incorporate speed control, engine braking, and clockwise and counterclockwise output shaft direction control as well.

10 Claims, 12 Drawing Sheets

(56) References Cited

U.S. PATENT DOCUMENTS

| | | | | |
|---|---|---|---|---|
| 2012/0299301 A1* | 11/2012 | Han | ........................ | F03B 15/02 290/52 |
| 2015/0357951 A1* | 12/2015 | Han | ........................ | F03B 15/08 290/43 |
| 2016/0010620 A1* | 1/2016 | Han | ........................ | F03D 17/00 290/43 |

* cited by examiner

ELECTRO-MAGNETIC RATCHET CONTROL APPARATUS AND METHOD

This application claims the right of priority to U.S. Provisional Patent Application Ser. No. 62/626,888 filed Feb. 6, 2018 by the same inventor.

TECHNICAL FIELD

The technical field of the invention relates to providing control apparatus for converting infinitely variable speed of reciprocating motion to provide both infinitely variable speed control and direction control that may be infinitely varying having an input, an output and a control and, more particularly, to apparatus and a method of controlling forward, neutral and reverse direction control of a vehicle that an electric coil that may change the polarity of a permanent magnet so that a permanent magnet attached to an output shaft will slow or speed up a forward or reverse vehicular motion or allow the driving wheels to be free-wheeling or neutral.

BACKGROUND OF THE INVENTION

A variable pitch cam has been introduced in prior patent applications and issued patents of the present inventor. The variable pitch cam comprises an internal cam shaft, a surrounding inner cam and an outer cam. The cam shaft may be connected or integral with the surrounding inner cam (rotating together) and the outer cam can be selectively rotated in reference to the inner cam orientation such that when the cam shaft rotates with the inner cam and the variable pitch cam is enclosed in an oblong housing (called a driver), the variable pitch cam may achieve a concentric position with the inner and outer cam aligned so as to be concentric, and an eccentric position with the inner and outer cam from beyond 0° to 180° put of alignment so that, when the variable pitch cam is driven, the center of the shaft is distant from the outer cam exterior or the cam eccentricity varies infinitely from a concentric to a maximum eccentric profile.

Also, in prior applications and patents of the inventor, there has been discussed the use of the variable pitch cam to construct a driver which upon movement of the variable pitch cam from a concentric position to an eccentric position causes a movement of the driver in, for example, a vertically up and downward movement with each turn of the cam shaft and inner cam.

This usage of drivers in connection with an input shaft having first and second sets of variable pitch cams for creating a passive circuit (driven circuit) and an active circuit (driving circuit) permits the construction of a so-called Goldfinch speed converter for controlling the speed of an output shaft using one-way clutch bearings or Sprags.

A weakness with the combination apparatus thus described is that there is no way to reverse the direction of rotational output of the output shaft without an additional reversing apparatus. Thus, there is needed in the art a way of providing both forward and reverse directions and neutral of an output shaft so that slowing down or reversing direction of a vehicle is accomplished via an electro-magnetic ratchet control. Magnetic ratcheting also can create engine braking output which is not possible with Sprags.

SUMMARY OF THE PREFERRED EMBODIMENTS

Embodiments of a Sprag or mechanical one-way clutch bearing imbedded in a driven gear are modified to incorporate a driven gear imbedded with a stator coil and an output shaft or a driven race with permanent magnets being made capable of both clockwise and counter-clockwise direction under electro-magnetic control.

Figure 1A:
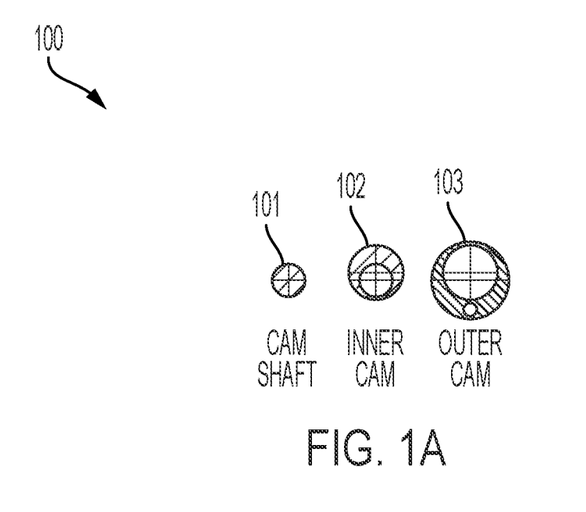
FIG. 1A shows components cam shaft 101, inner cam 102 (with cam shaft 101) and outer cam 103 (cam shaft 101 not shown) of a variable pitch cam shown in a concentric orientation as concentric cam 106 and eccentric cam 107 in driver 116, FIG. 1C.
Figure 1B:
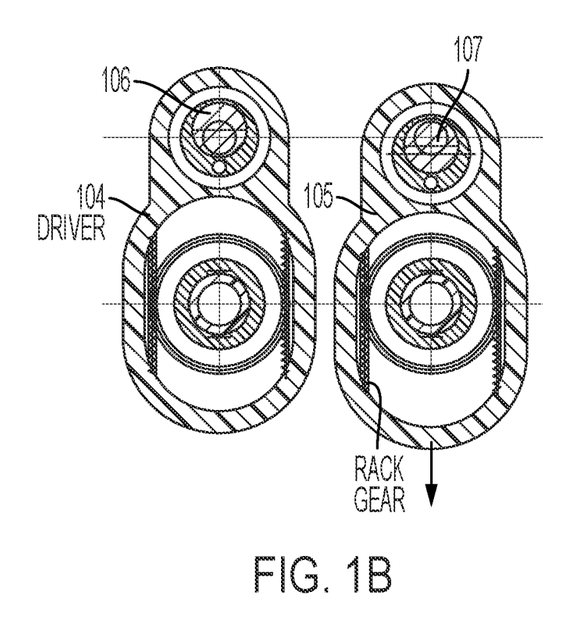
FIG. 1B shows a driver being driven in a direction of the downward arrow when one compares driver 104 with driver 105 and the use of the rotation of the variable pitch cam from concentric position 106 to eccentric position 107.
Figure 1C:
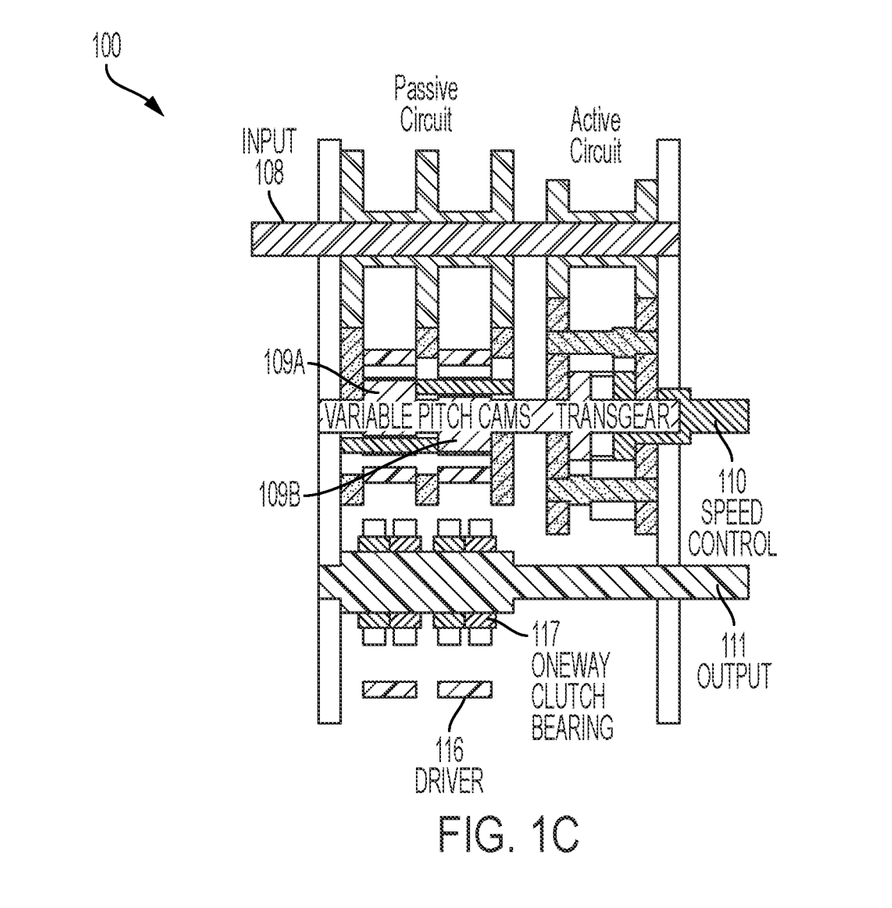
FIG. 1C shows a DDMotion Goldfinch™ speed converter in side view and FIG. 1D shows the Goldfinch speed converter in front view.
Figure 1D:
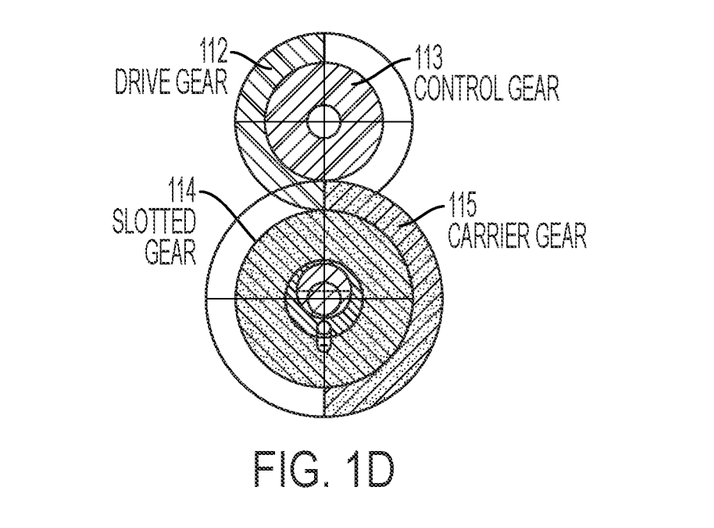

FIGS. 1A through 1D show the mechanical construction of a so-called Goldfinch™ speed converter and its component parts. FIG. 1A provides components of a known variable pitch cam. FIG. 1B shows an overview of the use of the variable pitch cam in a driver to produce reciprocating up and down motion as an input cam shaft (the cam shaft and inner cam of the variable pitch cam) rotates. FIGS. 1C and 1D show a side view and a front view respectively of a Goldfinch speed converter having an input shaft, a speed control for a variable pitch cam and a Transgear gear assembly and an infinitely variable output from zero to maximum rotational speed but limited in direction of rotation to either clockwise or counter-clockwise. It is an object of the present invention to modify the Goldfinch speed converter to operate electro-magnetically without Sprags or one-way clutch bearings in both a clock-wise and a counterclockwise direction output and not be limited by the direction output of rotation produced by a plurality of one-way clutch bearings driven by the up and down motion of the drivers. Clock-wise and counter-clockwise motion or forward and reverse vehicular motion may be features of a Goldfinch speed converter modified as described herein to incorporate an electro-magnetic ratchet control.

Figure 7A:
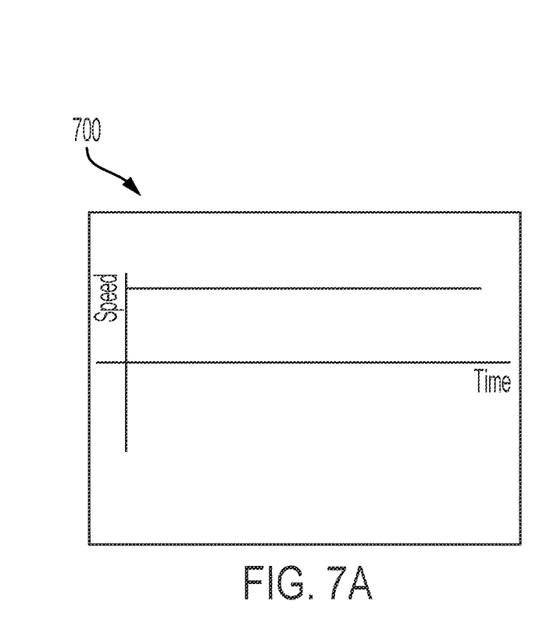
Figure 7B:
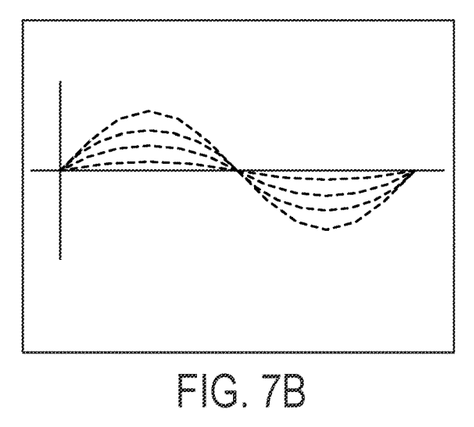
Figure 7C:
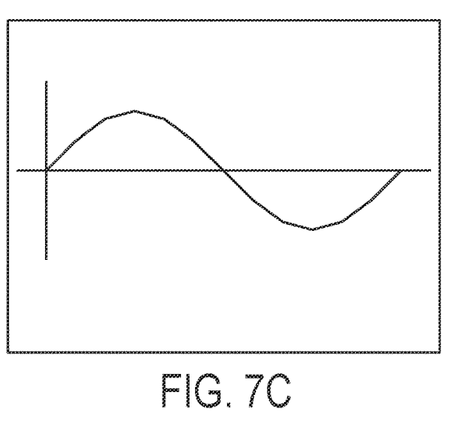
FIG. 7C shows selection of one of the family of curves, for example, having a maximum amplitude.
Figure 7D:
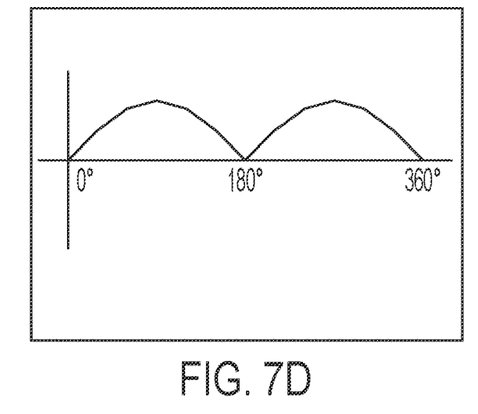
FIG. 7D shows half-wave rectification of FIG. 7C so that both 180° sections of the curve are positive.
Figure 7E:
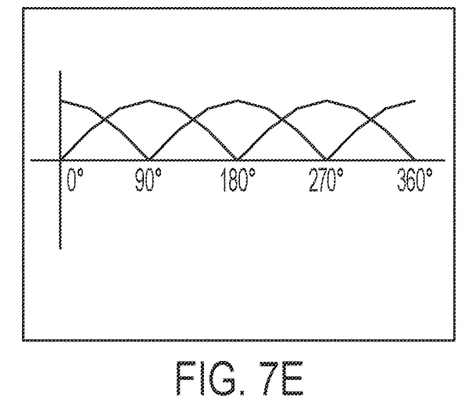
Figure 7F:
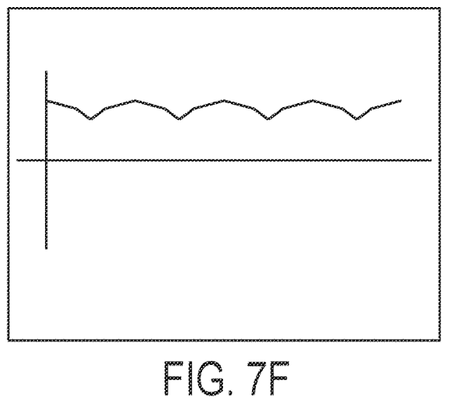

With multiple one-way clutch bearings operated by a Goldfinch speed converter, one may develop a family of curves of reciprocating motion as seen in FIG. 7B and select a particular curve depending on the speed and direction (or free-wheeling, neutral condition) that is desired. If one picks an output curve as seen in FIG. 7C, one may concentrate, for example, on the rectification or uni-directional output of each of two positive direction curves as seen in FIG. 7D comprising half-rectified curves at 180° spacing. For example, as the number of sine curves increases, there is produced a super-imposition of positive, multiple rectified sine curves as seen in FIG. 7E. FIG. 7F shows a produced output comprising a positive rectification of these superimposed positive curves and a rippled constant, positive or forward direction (for example, clockwise wheel motion of a vehicle). If one concentrates on two negatively generated, overlapping at 90° spaced curves or the bottom curves generated in FIG. 11C, then, one may create constant, negative or reverse direction of a vehicle. As we choose no curve or a minimum impact of electrical energy fed to a stator coil seen in driver FIG. 11B, the output can be neutral or free-wheeling or have no electro-magnetic influence on the driven wheels of a vehicle.

Figure 8:
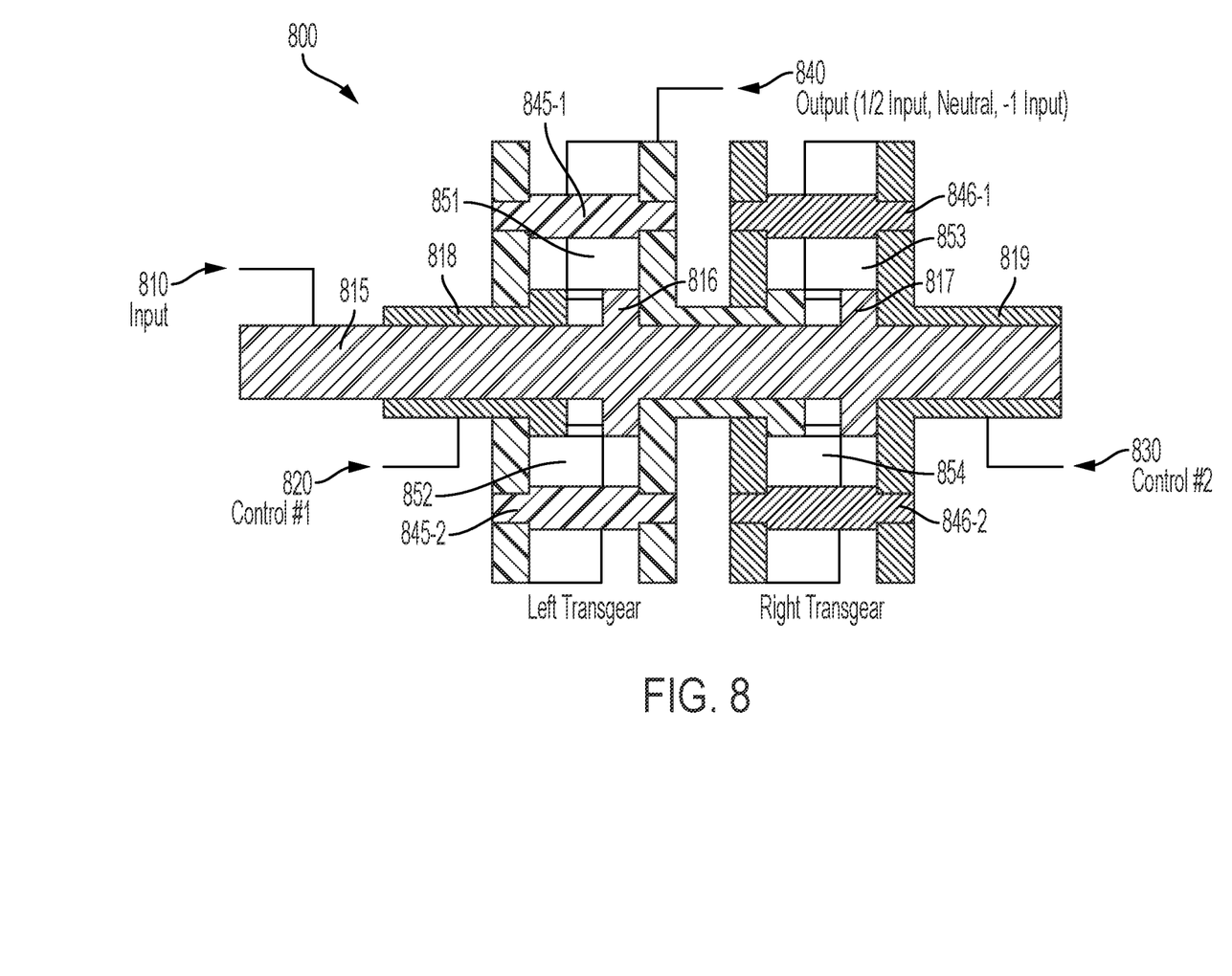

Referring briefly to FIG. 8, direction control may require two Transgear control gear assemblies where a first Transgear control, given input 810 to input shaft 815 is sleeve 818 (for one direction) for control #1 820 and sleeve 819 for control #2 830 which may provide the reverse direction. The output, for example, is taken from carrier 820-1 of ½ input, neutral or −1 input.

Figure 11A:
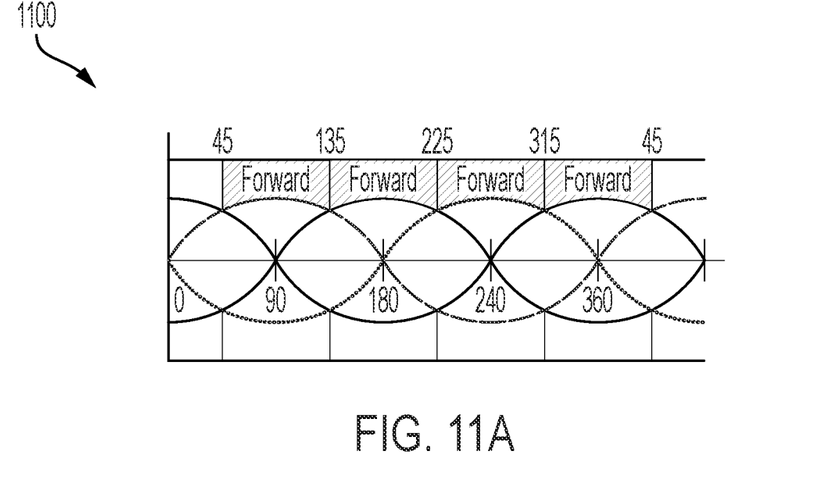
FIG. 11A represents a forward direction of output of FIGS. 9A and 9B.
Figure 11B:
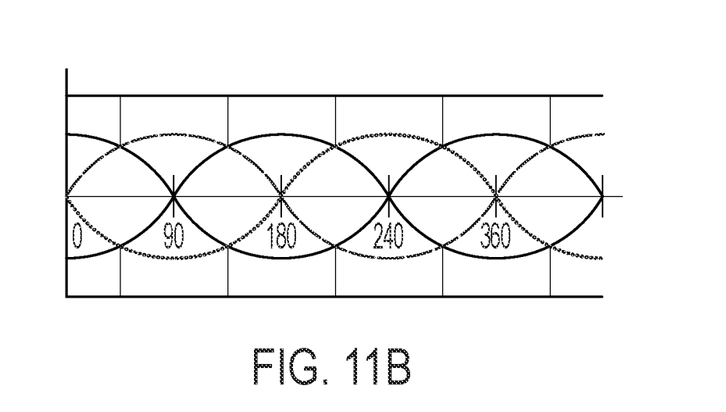
FIG. 11B represents a free-wheeling direction or neutral (no activation)
Figure 11C:
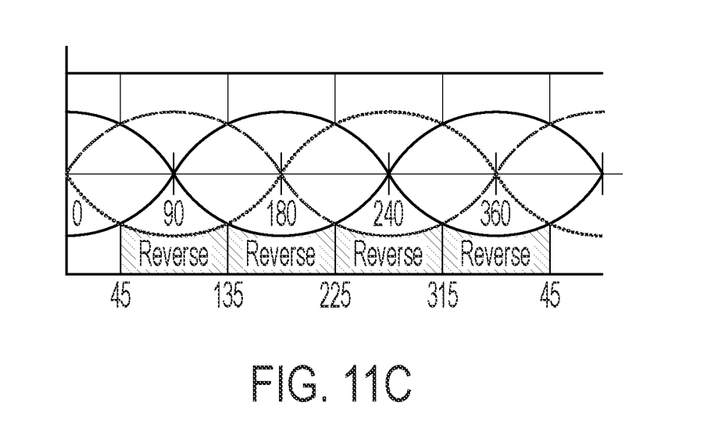
FIG. 11C represents a reverse direction and utilization of the bottom reverse/lower curves, super-imposed to provide a reverse direction of, for example, wheel rotation output. Electra-magnetic ratchet control provides advantages of high power density, elimination of any need for a separate direction controller (smaller and less costly), simplification of engine or motor braking and is flexible for use with different models of engine or motors.

FIGS. 11A, 11B and 11C are generated to show forward direction, neutral and reverse in an infinitely variable transmission (IVT) with angular indicators as 45°, 135°, 225°, and 315° and repeat. It is very useful to pulse in a given direction (or not pulse, neutral) or pulse in the opposite direction between steps of 45° to 135° and so on as shown. Because of the use of a permanent magnet gear or a permanent magnet attached to a driven gear and a stator coil one desirably wishes to stay as close to the ranges shown 45-135, 135-225, 225-315 and 315-45 and repeat as possible. In this manner, a vehicle may comprise an infinitely variable transmission and utilize the transmission (IVT) to reverse direction and to provide an engine or motor braking system.

The principles of three variable control, use of electromagnetic influences in each polarity of a stator coil and the like may actuate a controlling and speed conversion module to operate in both directions or come to rest using forward when going in reverse and reverse when going forward to achieve engine or motor braking and a neutral vehicular position. These and other embodiments and features will be described with respect to the drawings, a brief description of which follows.

BRIEF DESCRIPTION OF THE DRAWINGS

FIGS. 1A through 1D show a layout of a Goldfinch speed converter. FIGS. 1A-1D provide a plurality of views of component parts respectively as follows.

FIG. 1C shows a passive circuit or driven component of a left portion of input 108, the variable pitch cams 109A and 109B and a plurality of one-way clutch bearings 117 as well as drivers 116. An Active Circuit or driving components comprises the remaining input 108 shaft for meshing with a carrier and Transgear assembly where speed control is input by shaft/sleeve 110. The infinitely variable, uni-directional infinitely variable output from zero rotational speed or zero output (this is not a neutral) to a maximum speed in one direction of rotation is shown as the output of output shaft or output race 111 actuated by the plurality of one-way clutch bearings.

FIG. 1D shows aside view of the top portion of the Goldfinch speed converter with drive gear 112 and control gear 113 meshed with the bottom portion having slotted gear 114 meshed with drive gear 112 and carrier gear 115 meshed with the control gear 113. A concentrically oriented variable pitch cam is seen in the bottom portion of FIG. 1D. As will be further described herein, the Goldfinch will be modified to be electromagnetically controlled to operate in either of two directions of output shaft rotation or neutral (or in a vehicle, forward, neutral or reverse).

FIG. 2 provides a detailed cut-away view 200 of the Goldfinch speed converter of FIG. 1C. An Input shaft 255 comprises at top a portion of the passive circuit comprising three drive gears 201 or one long drive gear attached to the input shaft 255. Two control gears 202 or one long control gear are shown at right comprising a portion of the active circuit meshed with carrier gears 206 and 207. The Transgear assembly has three variables: the input 206/207, the control shaft 256 and the control 209/218/219 (control 275) and the output 285. A worm (gear) 219 may turn a worm gear 218/209 to change the angular position of control shaft 256 or the angular positions of inner cams. Correlating FIG. 1C with FIG. 2, Goldfinch 200, there may be a plurality of inner cams and outer cams of variable pitch cams and the one-way clutch bearings are shown as 220, 221, 222, 223 and driven gears 210, 211, 212, 213 for one rotational direction. One-way clutch bearings are imbedded inside of driven gears and driven gears are driven by drivers.

FIG. 4A (concentric cam) and FIG. 4B (eccentric cam) show further details of a variable pitch cam wherein

FIG. 6 shows the principle of operation of a one-way clutch bearing 600 referred to by its commercial name Sprag. There is shown an outer ring 615 surface (output) and an inner ring 622 surface (input). Let's assume that the inner ring (surface) 622 is the driver and the outer ring (surface) 615 is the output (driven). When the inner ring (surface) 622 rotates-counter-clockwise, as shown by arrow 630, roller bearings, needles, or balls 610-1 and 610-2 are encouraged by springs to be compressed between ramp surfaces 620-1 and 620-2 and the outer ring 615 respectively so that the outer ring (surface) 615 will be locked and moves counter-clockwise with the inner ring (surface) 622. On the other hand, when the inner ring 622 is rotating clockwise (not shown), then outer ring (surface) 615 is not encouraged to rotate at all. So if there is reciprocating motion of the inner ring (surface) 622, only when there is counter-clockwise movement of 622, there is counter-clockwise movement of surface 615. The end result is that surface 615 moves counter-clockwise with each reciprocating movement counter-clockwise of surface 622.

FIGS. 7A through 7F show an input to output conversion process of a plurality of one-way clutch bearings and an illustration of constant input to variable output (CIVO). FIG.

7A shows a constant input speed over time. As a Goldfinch operates, a family of variable amplitude curves as seen in FIG. 7B may be generated having variable amplitude. FIG. 7E shows super-imposition of two maximum amplitude curves at 90° to one another that have been half-wave rectified. When the waveforms of FIG. 7E are combined, a rippled constant output is produced (for example, in one direction). The rippled output is analogous to AC current in comparison to DC current. No problem in performance is expected from the rippled output. A DC type of non-rippled constant output can be produced by further increasing the number of rectified sine curves or by making the input rippled to cancel out the produced output ripples.

FIG. 8 shows a mechanical schematic drawing of a direction controller (outputs of most machines and vehicles require direction control) in accordance with an embodiment of a modified Goldfinch speed converter. First (left) and second (right) Transgear assemblies are shown having a common input 810 comprising a shaft 815 extending from left to right. A sun gear 816 of left Transgear is integral with or connected to shaft 815 and is meshed with upper (white) planetary gear 851 of carrier gear pin 845-1. Also, the left Transgear has control #1 820 comprising a sleeve and sun gear 818 meshed with another lower planetary gear (white) 852 of carrier gear pin 845-2. Planetary gear 851 meshes with planetary gear 852. A carrier/sleeve/sun gear 840 joins the first (left) carrier gear assembly and second (right) Transgear left sun gear. When control #1 820 is activated, the output 840 is ½ Input. Sleeve/carrier 819 is a second Control #2 830. When control #2 830 is activated, as is shown, the Output may be −1 Input ("−" sign meaning a reversal of direction). Such a direction controller comprising first and second Transgear or spur/helical gear assemblies may be replaced by using an electro-magnetic ratchet control in a driver as will be described with respect to FIGS. 9A and 9B showing electro-mechanical direction control.

FIG. 10 shows an activation sequence for a forward direction of output. The electro-magnetic modification provides forward, neutral and reverse directions (clockwise, free-wheeling or counterclockwise output shaft rotation). For a four period activation system, for example, a First Activation 45°-135° is shown utilizing the selected super-imposed upper sine waves. The Second Activation is 135°-225°, the Third is 225°-315° and the fourth activation is 315°-45° (and repeats). The activation angle may be less than the ranges shown to avoid potential interferences between activations but may be as close as possible to the ranges shown: 45-135, 135-225, 225-315 and 315-45. Along the central axis is shown the angles of 0, 90, 180, 240 and 360 comprising reference angles (Input/Cam shaft angles) where the first, second, third and fourth useful sine waves cross the central axis and present a mirror image in what will be referred to as the reverse direction in FIGS. 11A-11C.

FIGS. 11A through 11C show an overall series of three possible outcomes 1100 wherein

DETAILED DESCRIPTION

In the figures of the present embodiments of the invention, an effort has been made to follow a convention such that the first reference number such as 1XX indicates figure number where the element first appears, for example, cam shaft 101 first appearing in FIG. 1.

FIGS. 1A through 1D through FIG. 6 show a layout of a Goldfinch speed converter. FIGS. 1A through 1D provide views of component parts including an overview of a speed converter as follows comprising: an input shaft, a cam shaft comprising variable pitch cams and spur/helical gear assemblies, and an output shaft having one-way clutch bearings, known commercially as Sprags, and having an infinitely variable speed output from zero rotational speed to a maximum speed (FIG. 1C, output 111) but only in one direction of output such as forward. FIG. 8 provides a mechanical schematic drawing of a modification of a so-called Goldfinch™ speed converter of FIGS. 1A-1D and FIG. 6 to incorporate a direction controller as well as provide the function of a speed converter. FIGS. 9A and 9B and FIGS. 11A-C provide a schematic of an electro-magnetic modification to a known driver of a Goldfinch speed converter to incorporate an electro-magnetic ratchet control system to provide direction control of forward, neutral and reverse.

FIGS. 1A through 1D provide a plurality of views of component parts of a DDMotion Goldfinch speed converter respectively as follows: FIG. 1A shows components cam shaft 101, inner cam 102 and outer cam 103 of a variable pitch cam shown in a concentric orientation as concentric cam 106 and eccentric cam 107 in driver FIG. 1B including a rack gear.

FIG. 1B shows a concentric and eccentric views of a driver of a DDMotion Goldfinch speed converter comprising a driver being driven in a direction of the downward arrow when one compares concentric driver 104 with eccentric driver 105 and the use of the rotation of the variable pitch cam to move when rotated to eccentric position 107.

FIG. 1C shows a DDMotion Goldfinch™ speed converter in side view, and FIG. 1D shows the Goldfinch speed converter in front view. FIG. 1C shows a passive circuit or driven component of a left portion of input shaft 108, the variable pitch cams and a plurality of one-way clutch bearings 117 as well as drivers 116. An Active Circuit or driving components comprises the remaining input shaft 108 for meshing with slotted gears and carrier gears of a Transgear assembly where speed control is input by shaft/sleeve 110. The infinitely variable, uni-directional infinitely variable output from zero rotational speed or zero output (this is not a neutral) to a maximum speed in one direction of rotation is shown as the output of output race or output shaft 111 actuated by the plurality of one-way clutch gears.

FIG. 1D shows aside view of the top portion of the Goldfinch speed converter with drive gear 112 and control gear 113 meshed with the bottom portion having slotted gear 114 meshed with drive gear 112 and carrier gear 115 meshed with the control gear 113. A concentrically oriented variable pitch cam is seen in the bottom portion of FIG. 1D. As will be further described herein, the Goldfinch may be modified to be electromagnetically controlled to operate in either of two directions of output shaft rotation or free-wheeling or forward, reverse and neutral in a vehicle per FIGS. 11A-11C.

Figure 2:
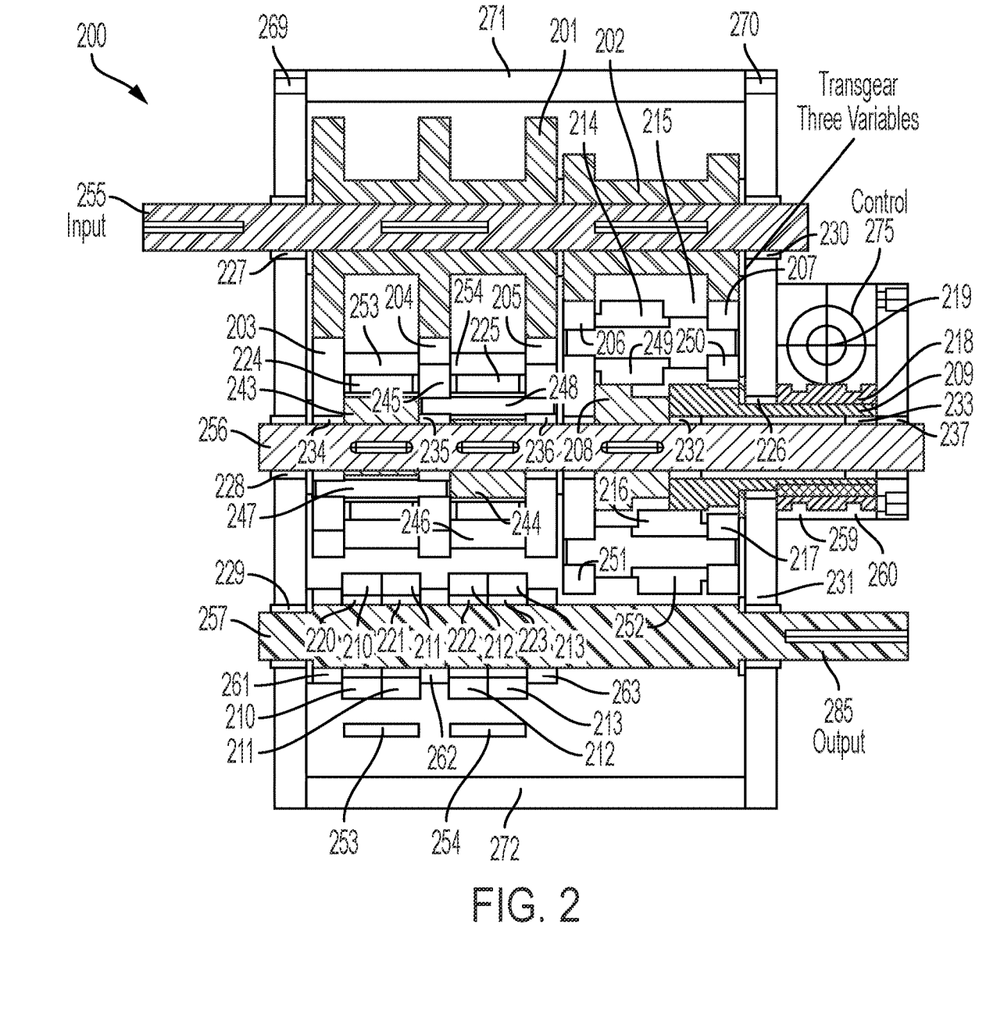

FIG. 2 provides a detailed cut-away view 200 of the Goldfinch speed converter of FIG. 1A through 1D. An Input shaft 255 comprises at a portion of the passive circuit comprising three drive gears 201 or one long drive gear attached to the input shaft 255. Two control gears 202 or one long control gear are shown at right comprising a portion of the active circuit meshed with carrier gears 206 and 207 or either one carrier gear of 206 or 207. A Transgear assembly has three variables: the input 255 (Transgear input variables 206/207), the output 256 and the control comprises elements 219, 218, and 209. A worm 219 may turn a worm gear 218 and sun gear 209 to change the angular position of inner cams. Correlating FIG. 1C with FIG. 2, Goldfinch 200, there may be a plurality of variable pitch cams at the left of output shaft 285 and the one-way clutch bearings are shown as 220, 221, 222, 223 and driven gears 210, 211, 212, 213 for one rotational direction. One-way clutch bearings are imbedded inside of driven gears and driven gears are driven by drivers.

Figure 3:
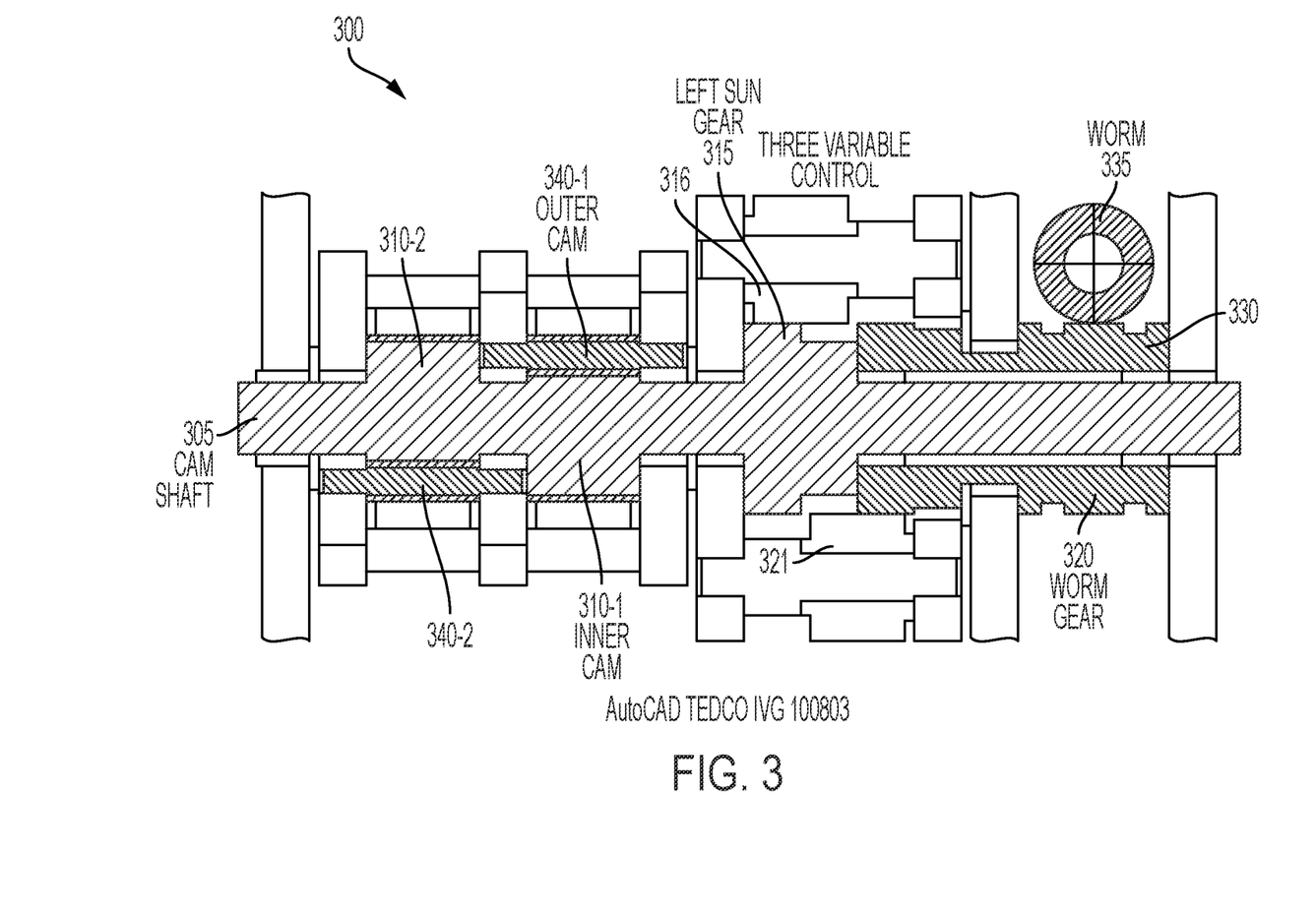
FIG. 3 provides details of the three-variable Transgear-controlled inner cams and outer cams of the central section 300 of FIG. 2 showing a left sun gear, inner and outer cams and a cam shaft. Cam shaft 305 is connected to or integral with inner cams 310-1 and 310-2 and outer cams 340-1 and 340-2. The cam shaft 305 continues to the right and comprises a left sun gear 315 connected to or integral with the cam shaft 305 and the left sun gear 315 meshes with planetary gear 316 and planetary gear 316 meshes with planetary gear 321. Planetary gear 321 meshes with right sun gear 320. The right sun gear 320 is seen just to the right of the left sun gear 315 and is connected or integral with the worm gear 330. The worm gear 330 is meshed with worm 335. The worm 335 controls the eccentricity of the variable pitch cams.

FIG. 3 provides details of a three-variable control 300 of the central section of FIG. 2. Cam shaft 305 is connected to or integral with inner cams 310-1 and 310-2 and outer cams 340-1 and 340-2 rotating around inner cams 310-1 and 310-2. The cam shaft 305 continues to the right and comprises a left sun gear 315 connected to or integral with the cam shaft 305 and the left sun gear 315 meshes with upper, white planetary gear 316. Planetary gear 316 meshes with planetary gear 321. The right sun gear 320 is seen just to the right of the left sun gear 315, is integral or connected to worm gear 330 and the worm 335 and worm gear 330 control are seen at the far right of the cam shaft 305.

Figure 4A:
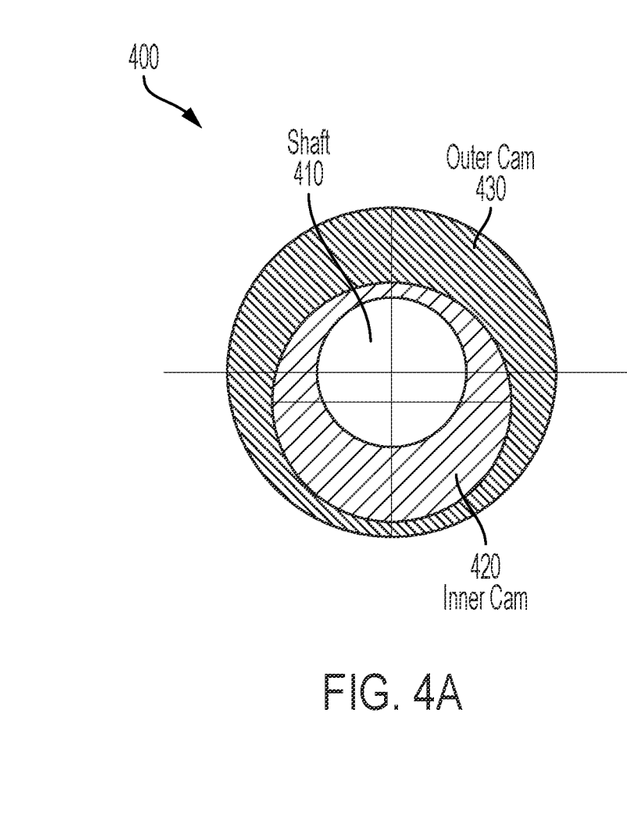
FIG. 4A shows a concentric cam comprising cam shaft 410, inner cam (or disc) 420 surrounding and connected to or integral with the shaft 410 and outer cam (or disc) 430 rotates about the inner cam 420 from a concentric position to an eccentric position (FIG. 4B) where the variable pitch cam has been driven downward or rotated 180 degrees in the direction of the arrow in FIG. 4B. The effective cam profile 440 is indicated by the circle encompassing the movement from concentric to eccentric including an infinite position not shown.
Figure 4B:
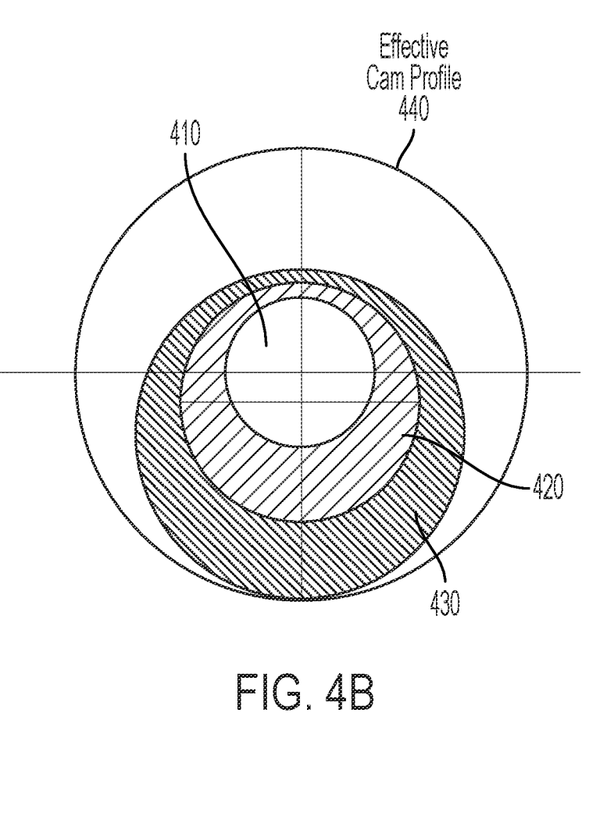

FIG. 4A and FIG. 4B show further details of a variable pitch cam wherein FIG. 4A shows a concentric cam comprising shaft 410, inner cam (or disc) 420 surrounding and connected to or integral with the shaft 410 and outer cam (or disc) 430 rotates about the inner cam 420 from a concentric position (FIG. 4A) to an eccentric position (FIG. 4B) where the variable pitch cam has been driven downward in the direction of the arrow at the right of FIG. 4B. The effective cam profile 440 is indicated by the circle encompassing the movement from concentric to eccentric including an infinite position not shown.

Figure 5A:
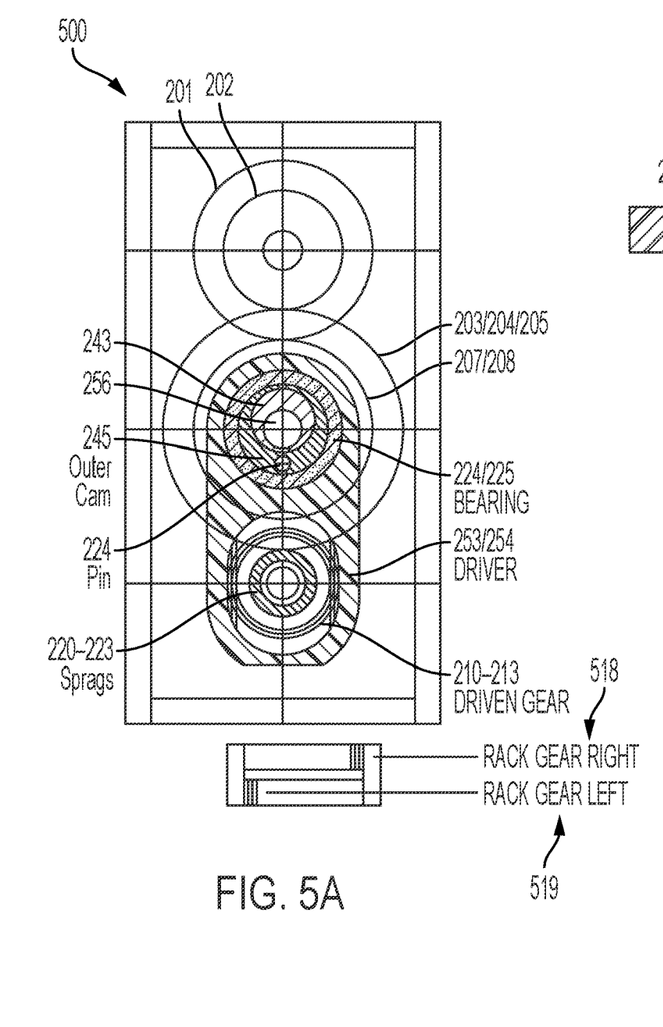
FIG. 5A and FIG. 5B show a further embodiment of a Goldfinch speed converter 500 from front view FIG. 5A for driver 253 and side view FIG. 5B for Sprags 220, 221, 222, 223 and driven gears 210, 211, 212, 213. The driver 253, driven gear 210 and Sprag 220 are seen in FIG. 5A and the drivers 253, 254, driven gears 210, 211, 212, 213 and the one-way clutch bearings (Sprags) 220, 221, 222, 223 are seen in FIG. 5B. Driven gear 210 is shown in FIG. 5A and Sprags 220, 221, 222, 223 in FIG. 5B. Bearings 224, 225 are seen surrounding outer cams 244. 245 of a variable pitch cam. The movement of driven gear 210 and one-way clutch bearing (Sprag) 220 of FIG. 5A corresponds to output 285 FIG. 5B). Right rack gear 518 and left rack gear 519 of the driver 253 are shown in FIG. 5A.
Figure 5B:
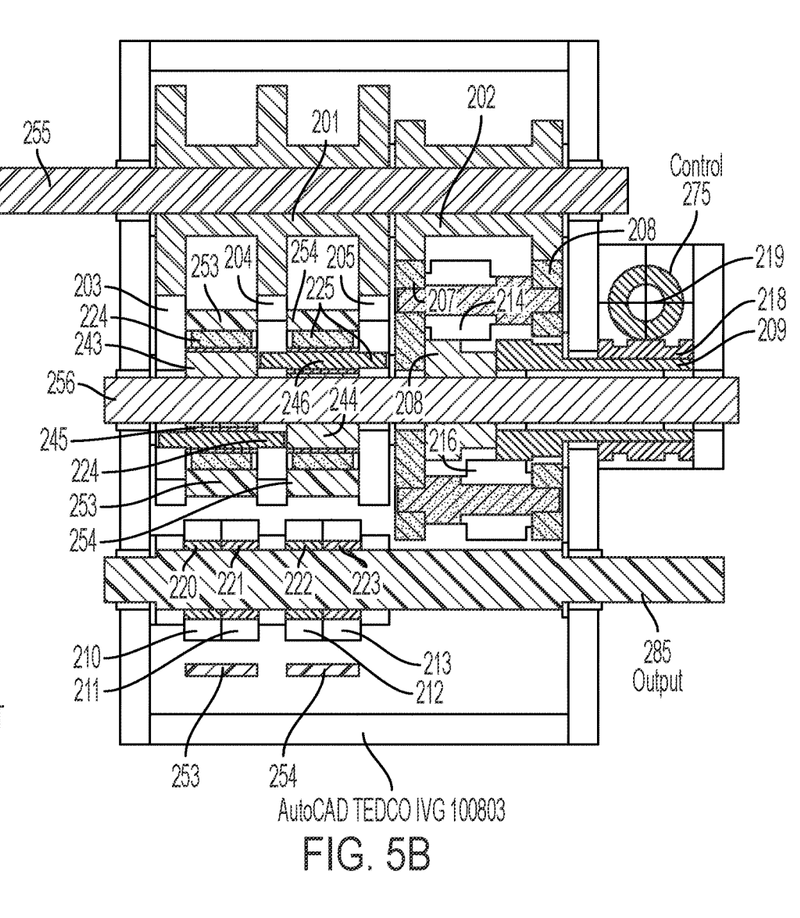

FIG. 5A and FIG. 5B show a further embodiment of a Goldfinch speed converter 500 from front view FIG. 5A (for driver 253) and side view FIG. 5B (for Sprags 220, 221, 222, 223) and for driven gears 210, 211, 212 and 213 (driven gear 210 in, FIG. 5A). The driver 253, driven gear 210 and Sprag 220 are seen in FIG. 5A (one Sprag 220 shown) and the one-way clutch bearings (Sprags 220, 221, 222 and 223) are seen in FIG. 5B. Input gears 201 mesh with slotted gears 203, 204, 205 (FIG. 5B) and control gears 202 which mesh with carrier gears 207, 208 (FIG. 5B). Bearings 224, 225 are (FIG. 5A) seen surrounding outer cams 244, 245 of variable pitch cam. The movement of driven gear 210 and one-way clutch bearing 220 corresponds to output 285 via driven gears 210, 211, 212 and 213 (FIG. 5B). Right rack gear 518 is shown above left rack gear 519 of the driver 253 in FIG. 5A.

Figure 6:
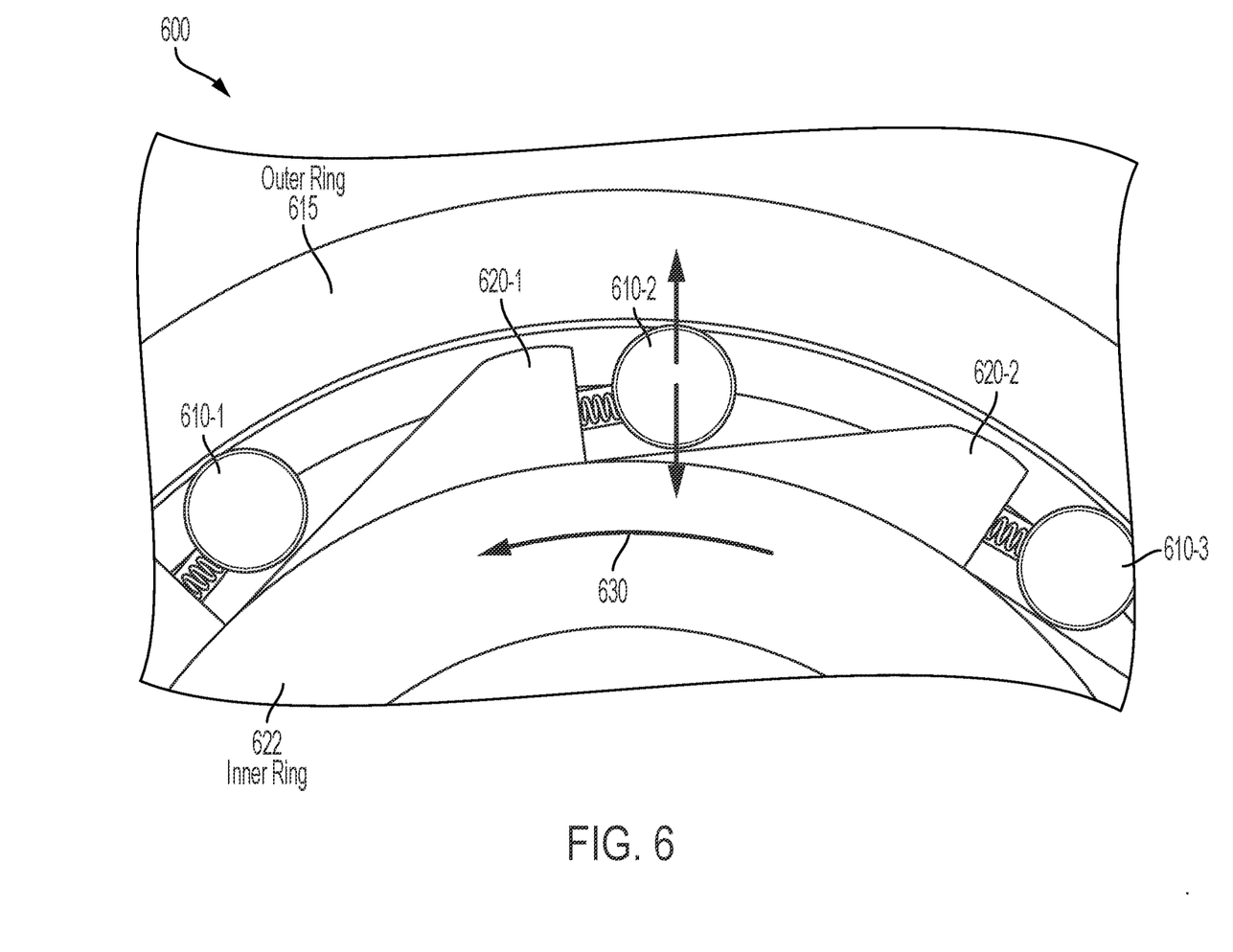

FIG. 6 shows the principle of operation of a one-way clutch bearing 600 referred to by its commercial name Sprag. There is shown an outer ring 615 surface and an inner ring 622 surface. Let's assume that the inner ring (surface) 622 is the driver and the outer ring (surface) 615 is the output (driven). When the inner ring (surface) 622 rotates counter-clockwise 630, (arrow shown), roller bearings, needles, or balls 610-1 and 610-2 are encouraged by springs (not numbered) to be compressed between ramp surfaces 620-1 and 620-2 (also 610-3) and the outer ring 615 respectively so that the outer ring (surface) 615 will be locked and moves counter-clockwise direction 630 with the inner ring (surface) 622. On the other hand, when the inner ring 622 is rotating clockwise, then outer ring (surface) 615 is not encouraged to rotate at all. So if there is reciprocating motion of the inner ring (surface) 622, only when there is counter-clockwise movement of 622, there is counter-clockwise movement of surface 615. The end result is that surface 615 moves counter-clockwise with each reciprocating movement counter-clockwise of surface 622 (analogous to half-wave rectification of alternating electrical current); (see FIG. 7D).

FIGS. 7A through 7F show an input to output conversion process of a plurality of one-way clutch bearings and an illustration of constant input to variable output (CIVO). FIG. 7A shows a constant input speed over time. As a Goldfinch speed converter operates, a family of variable amplitude curves as seen in FIG. 7B may be generated having variable amplitude (FIG. 7B). FIG. 7C shows selection of one of the family of curves, for example, having a maximum amplitude. FIG. 7D shows half-wave rectification of FIG. 7C so that both 180° sections of the curve are positive. FIG. 7E shows super-imposition of two maximum amplitude curves at 90° separation to one another that have been half wave rectified. When the waveforms of FIG. 7E are combined, a rippled constant output is produced (for example, in one direction) per FIG. 7F. The rippled output of FIG. 7F is analogous to rectified AC current in comparison to DC current, and no problem in performance is expected from the rippled rotational output shaft (960, FIG. 9A). A non-rippled constant rotational output by further increasing the number of rectified sine curves can be produced or at variable amplitudes per choosing a different amplitude sine curve for rectification per FIG. 7B or by making the input rippled to cancel out the produced output ripples.

FIG. 8 shows a mechanical schematic drawing of a direction controller (outputs of most machines and vehicles require direction control) in accordance with an embodiment of the invention for output of a modified Goldfinch speed converter with features of speed conversion and direction control (rotational direction CC, CCC or freewheeling) (vehicle direction forward, neutral or reverse). First (left)

and second (right) Transgear spur/helical gear assemblies are shown having a common input 810 comprising a shaft 815 extending from left to right. A left sun gear 816 is integral with or connected to shaft 815 and is meshed with a white upper carrier gear 851 and pin 845-1. Also, at the left is control #1 820 comprising a sleeve and sun gear 818 meshed with white lower carrier gear 852 of pin 845-2. Planetary gear 851 meshes with planetary gear 852. When control #1 820 is activated, the output is ½ input (meaning one-half of the input speed). A carrier/sleeve/sun gear 840 joins the first (left) carrier gear assembly and left sun gear of second (right) Transgear assemblies. When control #2 830 is activated, as is shown, the output 840 is −1 Input (meaning a reversal of direction). Sleeve/carrier 819 is a second Control #2 830. Such a direction controller comprising first (left) and second (right) Transgear assemblies may be replaced by using an electro-magnetic ratchet control in a driver as will be described with respect to FIGS. 9A and 9B showing electro-mechanical direction control.

Figure 9A:
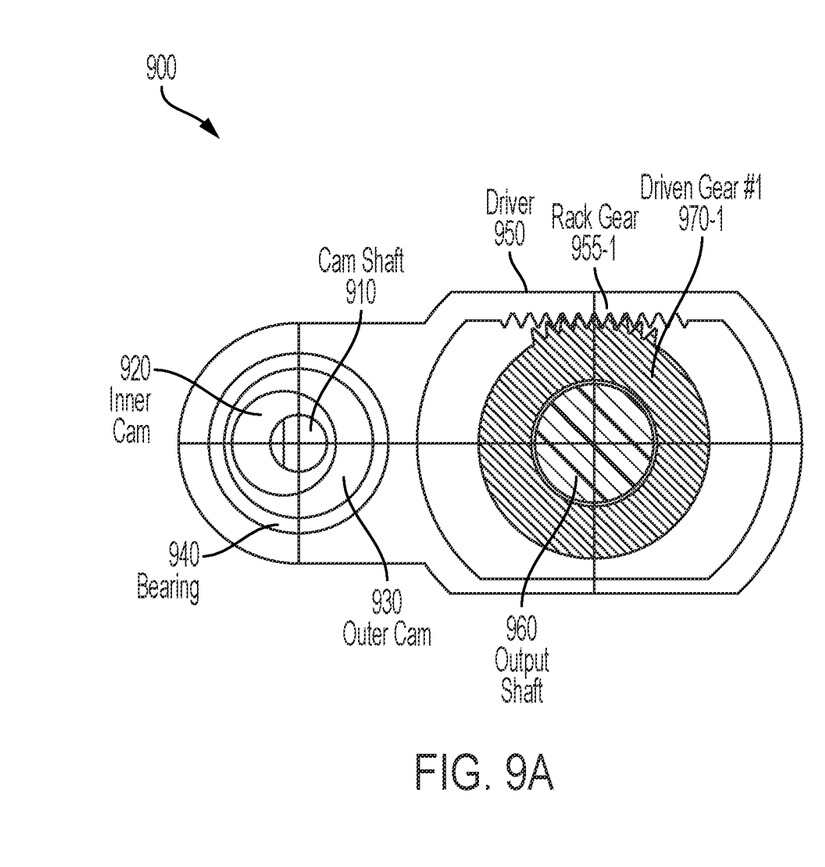
FIG. 9A (left side view) and 9B (front view) show a variation 900 of an embodiment of an electro-magnetic control of the Goldfinch speed converter to comprise stator coils 980-1, 980-2 and driven gears 970-1, 970-2 imbedded with permanent magnets (PM #1 and PM #2), 965-1, 965-2 per FIG. 9B to mesh with the rack gears (rack gear 955-1 shown) on both sides of the oblong driver 950. Concentric with the driven gears and stator coils 970 and within is a circular permanent magnet 965 which may adhere to the central output shaft 960 and be polarized in either direction of polarity or none. To the left of the oblong driver 950 is seen in FIG. 9A a conventional variable pitch cam with cam shaft 910, inner cam 920 and outer cam 930 (shown in a concentric position) within bearing 940. The stator coil 970 at the right of the oblong driver 950 may create an electro-magnetic field influencing the polarity of the permanent magnet 965 and, ultimately, the rotational direction of output shaft 960 (without the use of Sprags). The stator coil 970 may be fed by electric current in first and second directions (or no current) so that the permanent magnet 965 may be polarized N/S or S/N or neither. In this manner, and in substitution with FIG. 8, the Goldfinch speed converter has been modified to operate in first and second directions and neutral without using a uni-directional controller of Transgear assemblies or Sprags as the performance of the electro-magnetic control modification will be described with reference to FIG. 10 and FIGS. 11A-C.

FIG. 9A (left side view) and 9B (front view) show a variation 900 of an embodiment of an electro-magnetic control of the Goldfinch speed converter to comprise first and second stator coils 980-1, 980-2. FIG. 9A is an orthogonal cut view taken at line A-A of FIG. 9B such that first driven gear 970-1 is shown meshed with first rack gear 955-1. Attachments are designated by an X in FIG. 9B such that first and second permanent magnets 965-1, 965-2 are attached to output shaft 960; first and second stator coils 980-1, 980-2 are attached to first and second driven gears 970-1 and 970-2 respectively. As seen in FIGS. 9A and 9B, there is a respective gap between first and stator coils 980-1, 980-2 and first and second permanent magnets 965-1 and 965-2; respective gaps between first and second driven gears and first and second permanent magnets 965-1, 965-2 and output shaft 960. There are also gaps between the first and second driven gears 970-1 and 970-2. First and second driven gears 970-1, 970-2 of FIG. 9A mesh with first and second rack gears (rack gear 955-1 shown) on both sides of the oblong driver 950, electromechanical control replacing Sprag control of the previously discussed Goldfinch. Concentric with the first and second driven gears 970-1, 970-2 are first and second driver portions 950 driven by gear teeth. First and second stator coils 980-1 and 980-2 are circular and may each magnetically lock with respective first and second circular permanent magnet 965-1, 965-2 (PM #1, PM #2) which are shown attached to the central output shaft 960. The first and second permanent magnets 965-1, 965-2 may be polarized in either polarity. One of the first and second stator coils 980-1 and 980-2 or none may magnetically lock respectively to permanent magnets 965-1 and 965-2 and so move central shaft 960 with, for example, driven gear #1.970-1. To the left of the oblong driver 950 is seen in FIG. 9A a conventional variable pitch cam with cam shaft 910, inner cam 920 and outer cam 930 (shown in a concentric position) within bearing 940. The first and second stator coils 980-1 and 980-2 at the left and right of the two oblong driver components 950 shown in FIG. 9B may each create an electromagnetic field magnetically locking the first and second permanent magnets 965-1, 965-2 respectively, and, ultimately, selecting the forward or reverse rotational direction of output shaft 960 (without the use of Sprags). The first and second stator coils 980-1, 980-2 may be fed by electric current (see FIG. 11A for forward and FIG. 11C for reverse direction) causing first and second directions of output shaft movement (or no current per FIG. 11B and the output shaft 960 free-wheeling) so that the first and second permanent magnets 965-1, 965-2 may be polarized N/S or S/N. In this manner, and in substitution with the Goldfinch view of FIG. 8, the Goldfinch speed converter has been modified to operate in first and second directions and neutral without using a uni-directional controller of Transgear assemblies or Sprags as the performance of the electro-magnetic control modification will be described with reference to FIG. 10 and FIG. 11A through 11C.

Figure 10:
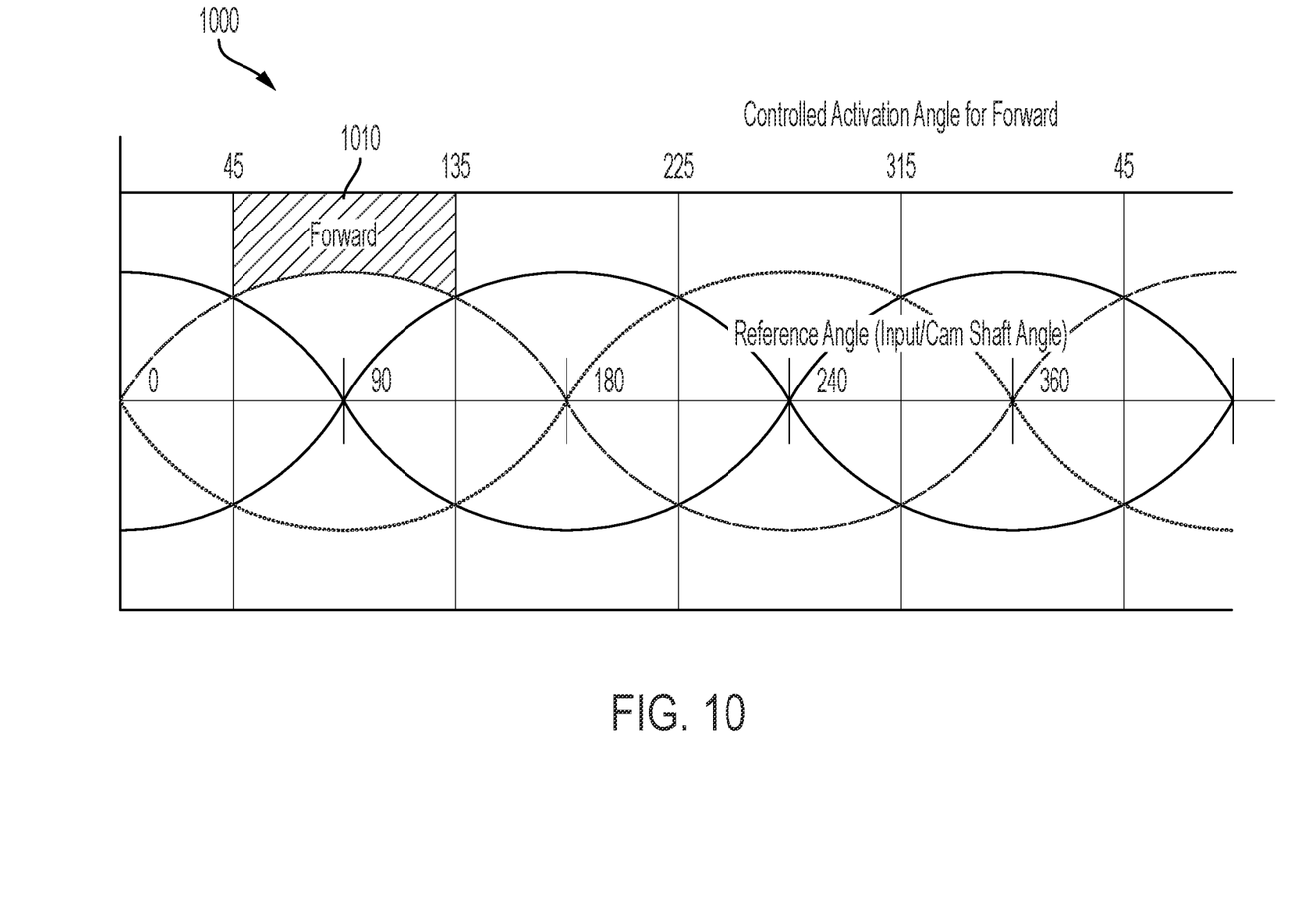

FIG. 10 shows an electromagnetic activation sequence for a forward direction of output. The electro-magnetic modification provides forward, neutral and reverse directions (clockwise, free-wheeling or counterclockwise output shaft rotation. For a four-period activation system, for example, a First Activation 45°-135° is shown utilizing the selected superimposed and rectified upper sine waves. The Second Activation is 135°-225°, the Third is 225°-315° and the fourth activation is 315°-45° (and repeats). The activation angle may be less than the ranges shown to avoid potential interferences between activations but may be as close as possible to the ranges shown: 45-135, 135-225, 225-315 and 315-45. Along the central axis is shown the angles of 0, 90, 180, 240 and 360 comprising reference angles (Input/Cam shaft angles) where the first, second, third and fourth useful sine waves cross the central axis and present a mirror image in what will be referred to as the reverse direction in FIGS. 11A through 11C.

Figure 9B:
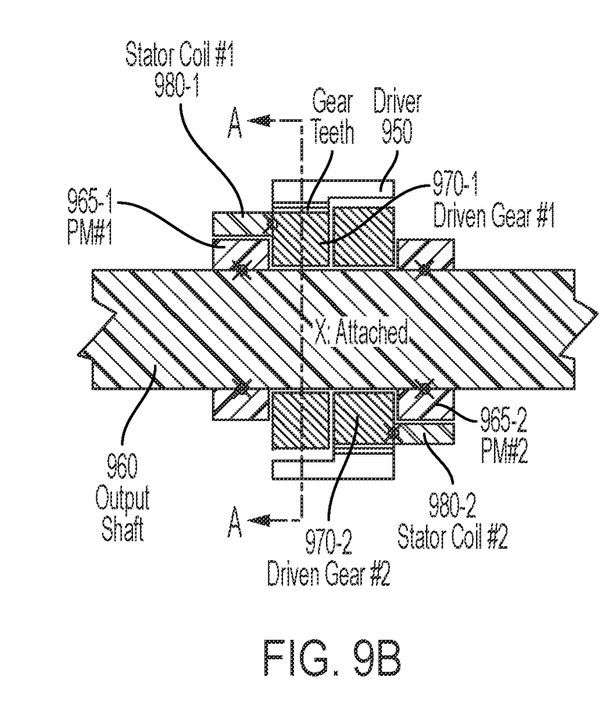

FIGS. 11A through 11C show an overall series of three possible outcomes wherein FIG. 11A represents a forward direction of output of FIGS. 9A and 9B; FIG. 11B represents a free-wheeling direction or neutral (no activation), and FIG. 11C represents a reverse direction and utilization of the bottom reverse/lower curves, rectified and super-imposed to provide a reverse direction of, for example, wheel rotation output. FIGS. 11A-11C are shown with four (4) sine waves. The forward output, for example, is a combination of four different sections of four different sine waves. The reverse direction is a different combination of four different sections of four different sine waves. Electro-magnetic control (using stator coils for magnetically locking the connected driven gears to the permanent magnets of the output shaft) for changing directions of rotation provides advantages of high power density, elimination of any need for a separate direction controller (smaller and less costly), simplification of engine or motor braking and is flexible for use with different models of engine or motors without the use of sprags or ratchets.

The principles of application of the several discussed embodiments of a structure and method of constructing same for, for example, providing a direction controller for a speed converter comprising a passive circuit of variable pitch cams and rack gears of drivers using electro-magnetic ratchet control (or a two spur gear direction controller assembly) provides advantages such as efficiency and ease of use by simply providing a driven gear and stator coil for changing magnet polarity and, as a result, rotational direction of the central output shaft of a driver among forward, neutral and reverse directional options. The present embodiments used in conjunction with known or contemplated vehicular systems may be enhanced by using multiple drivers and electro-magnetic control systems for improved direction control operation of a vehicle, which may be an automobile, truck, boat or ocean liner. These and other advantages of a speed controller or directional controller as described, for example, by FIGS. 5A, 5B and FIG. 8 and by FIGS. 9A and 9B and a further method of direction control may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

What I claim is:

1. A mechanical speed converter having an electro-magnetic control for changing direction of an output shaft of the mechanical speed converter, the mechanical speed converter comprising:

a driver having oblong sides, the driver having a first and a second distal end, the first distal end comprising a variable pitch cam having a shaft, an inner cam and an outer cam such that the variable pitch cam upon rotational movement of the shaft moves from a concentric position to an eccentric position causing the driver to move in a direction along its length, the driver at the second distal end comprising a central output shaft attached to first and second permanent magnets, first and second driven gears respectively driven by first and second rack gears of a driver, the first and second driven gears respectively located proximate to and gapped from one another and from the central output shaft, first and second stator coils polarized as one of north/south and south/north to selectively/magnetically lock with the first and second respective permanent magnets of opposite polarity, the first and second stator coils in respective combinations with the first and second permanent magnets gapped from the first and second driven gears selectively/magnetically locking the central output shaft to change direction of rotation, and the first and second stator coils being activated by a plurality of positive alternating electrical current curves causing the output shaft to be rotated in a forward direction and little or no current activating one of the first and second stator coils causing a neutral position or free-wheeling of the central output shaft and being activated by a plurality of negative electrical current curves causing the central output shaft to be rotated in a reverse direction.

2. The mechanical speed converter of claim 1 wherein the first and second rack gears of the driver comprise first and second parallel meshing surfaces on each side of the driver for meshing with the first and second driven gears attached to the first and second stator coils, and first and second circular sections at each end of the driver to permit the central output shaft, first and second permanent magnets and first and second driven gears and first and second stator coils to move from one end of the first and second rack gears to the other end of the first and second rack gears responsive to the driver, the movement caused by the concentric/eccentric change of shape of the variable pitch cam.

3. The mechanical speed converter of claim 1 wherein the first and second stator coils receive four activations of selective/magnetic locking for one of forward and reverse direction of the central output shaft by four overlapping sine waves of 0°, 90°, 180° and 270° reference angle comprising a relationship between an input and a variable pitch cam shaft angle.

4. The mechanical speed converter of claim 3 wherein a forward direction of the central output shaft is achieved by activating an upper portion of four sine waves of one of the first and second stator coils at 45° to 135°, 135° to 225°, 225° to 315° and 315° to 45° to couple with a polarity of the respective one of the first and second permanent magnets comprising first and second circular permanent magnets.

5. The mechanical speed converter of claim 3 wherein a reverse direction of the central output shaft is achieved by activating a second, different lower portion of four sine waves of one of the first and second stator coils at 45° to 135°, 135° to 225°, 225° to 315° and 315° to 45° couple with the polarity of a respective one of the first and second permanent magnets comprising first and second circular permanent magnets.

6. The mechanical speed converter of claim 3 wherein a neutral or free-wheeling is achieved by no activation of sine waves of either of the first and second stator coils of a respective one of the first and second permanent magnets.

7. The mechanical speed converter of claim 1, the first and second permanent magnets comprising first and second circular permanent magnets, each surrounding and separately attached to the central output shaft.

8. The mechanical speed converter of claim 1, the first and second stator coils comprising first and second circular stator coils, the circular first and second stator coils each respectively surrounding and gapped from a respective one of the first and second permanent magnets comprising first and second circular permanent magnets.

9. The mechanical speed converter of claim 8 wherein the first circular permanent magnet is attached to the central output shaft and the first circular stator coil surrounds and is gapped from the first circular permanent magnet and the second circular stator coil surrounds and is gapped from the second permanent magnet attached to the central output shaft.

10. The mechanical speed converter of claim 9 wherein the first and second stator coils receive electric current or no current to cause one of first and second directions or freewheeling of the central output shaft by magnetically locking to a polarity of the respective one of the first and second permanent magnets or no magnetic locking.

* * * * *